US006421434B1

United States Patent
Rosu

(10) Patent No.: US 6,421,434 B1
(45) Date of Patent: Jul. 16, 2002

(54) SYSTEM FOR THE MARKETING OF TELECOMMUNICATIONS TRAFFIC CAPACITY

(75) Inventor: Corneliu S. Rosu, Enskede (SE)

(73) Assignee: Telefonaktiebolaget L M Ericsson (Publ) (SE)

( * ) Notice: Subject to any disclaimer, the term of this patent is extended or adjusted under 35 U.S.C. 154(b) by 0 days.

(21) Appl. No.: 09/199,830

(22) Filed: Nov. 25, 1998

(51) Int. Cl.⁷ ............................................. H04M 15/00
(52) U.S. Cl. ............ 379/133; 379/112.01; 379/112.05; 379/114.01; 379/114.06; 379/121.01
(58) Field of Search ................................. 379/113, 114, 379/133, 134, 111, 112.01, 112.05, 112.06, 114.01, 114.02, 115.01, 219, 114.05, 114.06, 114.08, 121.01, 220.01, 221.01

(56) References Cited

U.S. PATENT DOCUMENTS

| | | | |
|---|---|---|---|
| 3,703,006 A | | 11/1972 | Sharma ........................ 444/1 |
| 4,831,373 A | | 5/1989 | Hess ....................... 340/825.03 |
| 4,870,408 A | | 9/1989 | Zdunek et al. ......... 340/825.03 |
| 4,992,940 A | | 2/1991 | Dworkin ...................... 364/401 |
| 5,065,393 A | * | 11/1991 | Sibbitt et al. ................ 379/112 |
| 5,123,112 A | | 6/1992 | Choate ....................... 455/56.1 |
| 5,159,695 A | | 10/1992 | Comroe et al. ................ 455/9 |
| 5,212,804 A | | 5/1993 | Choate ....................... 455/33.1 |
| 5,301,359 A | | 4/1994 | Van den Heuvel et al. 455/56.1 |
| 5,359,649 A | * | 10/1994 | Rosu et al. .................. 379/113 |
| 5,428,819 A | | 6/1995 | Wang et al. ................. 455/34.1 |
| 5,606,602 A | * | 2/1997 | Johnson et al. ............. 379/115 |
| 5,790,642 A | * | 8/1998 | Taylor et al. ................ 379/115 |
| 6,005,926 A | * | 12/1999 | Mashinsky ................... 379/114 |
| 6,134,306 A | * | 10/2000 | Lautenschlager et al. ... 379/114 |
| 6,144,727 A | * | 11/2000 | Mashinsky ................... 379/112 |
| 6,226,365 B1 | * | 5/2001 | Mashinky ................... 379/112 |

FOREIGN PATENT DOCUMENTS

| | | |
|---|---|---|
| EP | 102226 | 2/1999 |
| WO | WO 96/11551 | 4/1996 |
| WO | WO 97/22213 | 6/1997 |

OTHER PUBLICATIONS

Nagao Ogino, A Multi–Agent Based Bandwidth Allocation Scheme, IEEE Global Telecommunications Conference, Phoenix, Arizona, Nov. 3–8, 1997, vol. 3, Nov. 3, 1997, pp. 1706–1613, XP000737813.

Christopher H. Morton, et al., The Intelligent Bandwidth Manager and Its Role in Enterprise Networks, AT&T Technical Journal, vol. 72, No. 6, Nov. 1, 1993, pp. 57–66, XP000434020.

* cited by examiner

Primary Examiner—Binh Tieu
Assistant Examiner—Quoc Tran
(74) Attorney, Agent, or Firm—Jenkens & Gilchrist, A Professional Corporation

(57) ABSTRACT

A plurality of telecommunication traffic providers are connected to supply information about the current utilization of their networks to a dedicated network element to which is also connected a plurality of potential buyers of traffic capacity. The dedicated network element includes local and wide area data networks over which information about the existence of available network capacity among the providers is communicated to an administration center. The administration center makes that information available via the data network to the participating potential buyers and, thereafter, brokers the sale of the available telecommunication capacity from providers to buyers. It also monitors and assures that the buyers receive the benefit of their purchased capacity and the terms under which their sales were made.

19 Claims, 8 Drawing Sheets

| | |
|---|---|
| BAND WIDTH-Kbits/s | 401 |
| FROM-TO (Strain) | 402 |
| (RELIABILITY) GUARANTEE -LINK FAILURE-(YES/NO) | 403 |
| (RELIABILITY) GUARANTEE -NODE FAILURE- (YES/NO) | 404 |
| OFFERED BLOCKING (G.O.S.) | 405 |
| OVERFLOW GUARANTEE | 406 |
| SOLD BY | 407 |
| BOTH BY (Flag set by buyer) | 408 |
| STRETCH 1 (IF ANY) | 409 |
| - | |
| STRETCH k | 410 |
| - | |
| STRETCH n | 411 |
| | |
| DURATION OF TIME | 412 |
| MAINTAINABILITY OF STRAIN | 413 |
| OTHER | 414 |
| OTHER | 415 |
| OTHER | 416 |

*FIG. 7*

| To/From | A (New York) | B (London) | | I (Hong Kong) | N (Tokyo) |
|---|---|---|---|---|---|
| A (New York) | | | | | |
| B (London) | | | | | |
| | | | | | |
| I (Hong Kong) | | | | (Price & Duration) | |
| | | | | | |
| N (Tokyo) | | | | | |

*FIG. 8*

SYSTEM FOR THE MARKETING OF TELECOMMUNICATIONS TRAFFIC CAPACITY

BACKGROUND OF THE INVENTION

1. Field of the Invention

The invention relates to telecommunications networks, and more particularly, to the analysis of traffic carrying capacity within telecommunications networks and the marketing of that capacity to communications users that need it.

2. History of the Related Art

Telephone instruments and other communications devices located in the same geographic area are conventionally connected to one another by means of switching equipment referred to as an exchange. Communications between telephone/data instruments located in geographic areas separated from one another and connected to different exchanges communicate with another by means of complex interconnections on both local exchanges and trunk exchanges linked together into a telecommunications network. Networks may take the form of a grouping of interconnected network elements, such as local exchanges, trunking exchanges, mobile radio exchanges, long distance exchanges, and combinations thereof. At each network level, traffic from one network element, such as an exchange, to another can take various routes through different exchanges.

Efficient network traffic management of the communications facilities within the network requires that a sufficient number of circuits are available to handle the traffic requirements to each destination without exaggerated congestion on last-choice routes. As a general rule, it also requires that the network congestion is as even as possible on all last-choice routes and that there not be any undue excess capacity within the circuits of the routes which are actually provided in order to assure efficient utilization of resources. In addition, the telephone administration which operates the network has a limited budget and must get as much efficiency as possible out of the existing resources in each network.

Despite attempts to balance network loading in a network, traffic patterns within the network can vary over a period of weeks or months when, for example, new hotels or new customers providing database services are added to an exchange forming part of the network. Similarly, traffic patterns usually vary over a period of days, for example, when an international sporting event lasting several days is held in a particular geographic area within the network. In addition, traffic patterns in a network commonly change in a cyclic pattern over 24 hours, since traffic increases during certain hours of the business day and decreases to virtually zero during certain hours of the night and early morning. Thus, given the network dimensioning necessary to handle the busy period loading of a network, it should be possible to more efficiently capitalize upon an operator's investment in that network by utilizing it for other revenue generating services which require traffic capacity during its non-busy periods, e.g., the delivery of video on demand within the network market area during the evening and early morning hours.

Various systems have been employed to balance and adjust the traffic loading and congestion within telecommunications networks. For example, in U.S. Pat. No. 5,359,649 issued Oct. 25, 1994, to Rosu, et. al. and assigned to the assignee of the present invention, and which is hereby incorporated by reference herein, a system is provided for optimizing the traffic carrying capacity of a network having a plurality of elements and a plurality of routes connecting those elements to one another.

In this system, congestion in a network is controlled by identifying and limiting defective devices and routes within the network which have exaggerated level of congestion. Disturbance alarm levels are adjusted within the network to allow increased traffic through it and the traffic is reconfigured in real time in response to the occurrence of network events in order to optimize the traffic carrying capacity of the network.

Despite such congestion balancing techniques, the available traffic carrying capacity on a network is always changing. Frequently substantial excess traffic carrying capacity within the network, which represents a very large investment on the part of the network operator, goes completely unused. Since a network operator's need for utilization of existing capacity within his network is continuously fluctuating due to unpredictable growth and contraction in the number of customers utilizing the network and the types of services rendered through the network it is difficult to precisely anticipate excess capacity. Additionally, the operator's need for traffic capacity fluctuates through the busy hours of everyday, as well as each week due, to work week/weekend patterns and throughout the months of the year due to vacation and holiday occurrences. This excess traffic carrying capacity could be made available by the operator to other operators who might require additional traffic carrying capacity at the same time another operator has that capacity available.

However, in order to make possible the identification and marketing of excess network traffic capacity, it would be necessary to provide a system for compiling and uniformly presenting available traffic capacity data to interested buyers in a totally operator independent fashion. In addition, such an approach in the handling of excess traffic carrying capacity would require a dedicated network to organize available capacity data and forward this data to a marketplace to implement a system of brokerage in such capacity. While most available switching systems in use today provide for monitoring, balancing and controlling network traffic using network traffic management systems and techniques such as that disclosed in the '649 patent, they are unable to provide the kind of available capacity data necessary for the marketing of that capacity to interested buyers.

Certain systems are available for inventorying the existence c)f unused traffic capacity by means of switch and network audits, however, such systems are purely long-term in nature in that they require several months for an implementation cycle. Additionally, other systems, such as those discussed in the '649 patent, are able to implement network performance review on more of a closed circuit real time basis; however, each such system is generally vendor specific and dedicated to monitoring of capacity within a single operator rather than the collection of data from various networks in an operator independent fashion in order to market available traffic handling capacity.

Systems have been developed for the electronic maintenance of databases containing product inventories from various vendors with the capability to search those databases based upon price, vendor, product specifications and/or availability. For example, see U. S. Pat. No. 4,992,940 to Dworkin. However, providing the ability for a single user to perform a computer search of a database for the purchase of a discrete product or service is a far cry from the real-time marketing of such an ephemeral commodity as network traffic capacity. Such capacity is constantly fluctuating and there are not only many vendors but also many potential buyers each of whom is competing with the others for the same capacity.

Another aspect of the potential marketing of excess traffic carrying capacity is that once that capacity is sold to a user, there must be a means for monitoring the continued availability of the capacity and ensuring that the buyer obtains what he has bargained for, by continuously supervising the available capacity in real time.

Part of a practical excess traffic capacity assessment marketing and assurance system would include the provision of a traffic capacity trading data set and forms for reporting such capacity for sale to potential buyers. Thus, there exists a need for a method and system for implementing such techniques and procedures for monitoring, assessing, and presenting excess traffic carrying capacity to potential buyers and then assuring that such a buyer receives the benefit of the capacity contracted for.

SUMMARY OF THE INVENTION

The invention relates to a dedicated overlay network for the monitoring and reporting of traffic, switching and signaling capacity within a network to enable potential buyers to obtain the benefit of excess capacity within the network. The invention includes a vendor independent network element positioned within the network for assessment, compilation, and unitary presentation of excess traffic capacity for sale to potential buyers.

In one aspect, the system of the present invention optimizes the utilization of network traffic carrying capacity by communicating information related to traffic capacity on various routes within said network to a dedicated network element. A plurality of network traffic capacity providers are connected to the dedicated network for making available to network element traffic carrying capacity on idle routes within their respective network elements. A plurality of traffic capacity users are also connected to the dedicated network element for utilizing available traffic carrying capacity within the traffic carrying network elements of the providers. A traffic capacity and brokerage administration center is connected to the dedicated network element for gathering data regarding the availability of traffic carrying capacity within the traffic carrying network elements of the providers, formatting those data in a usable form and presenting it to said traffic capacity users for possible purchase. Available traffic routes are interconnected from providers to purchasing users in response to purchase of traffic carrying capacity by a user.

In a further aspect, the present invention includes optimizing the utilization of available traffic carrying routes within a network by gathering information related to available traffic carrying capacity on various routes within the network elements of traffic capacity providers within the network. The gathered information related to available traffic carrying capacity is organized and formatted and furnished to a plurality of traffic capacity users. The purchase of available traffic carrying capacity by one or more of the users is brokered and the delivery of access to the purchased traffic carrying capacity of providers by said purchaser user(s) is arranged. Additionally, the availability of traffic carrying capacity purchased by a user may be monitored to ensure that the purchased capacity is received.

BRIEF DESCRIPTION OF THE DRAWINGS

For an understanding of the present invention and for further objects and advantages thereof, reference can now be had to the following description, taken in conjunction with the accompanying drawings in which:

FIG. 7 is a pictorial diagram showing one format for the presentation of data regarding available traffic carrying capacity;

FIG. 8 is a pictorial diagram showing an alternative format for the presentation of data regarding available traffic carrying capacity;

DETAILED DESCRIPTION OF THE PREFERRED EMBODIMENT

Figure 1:
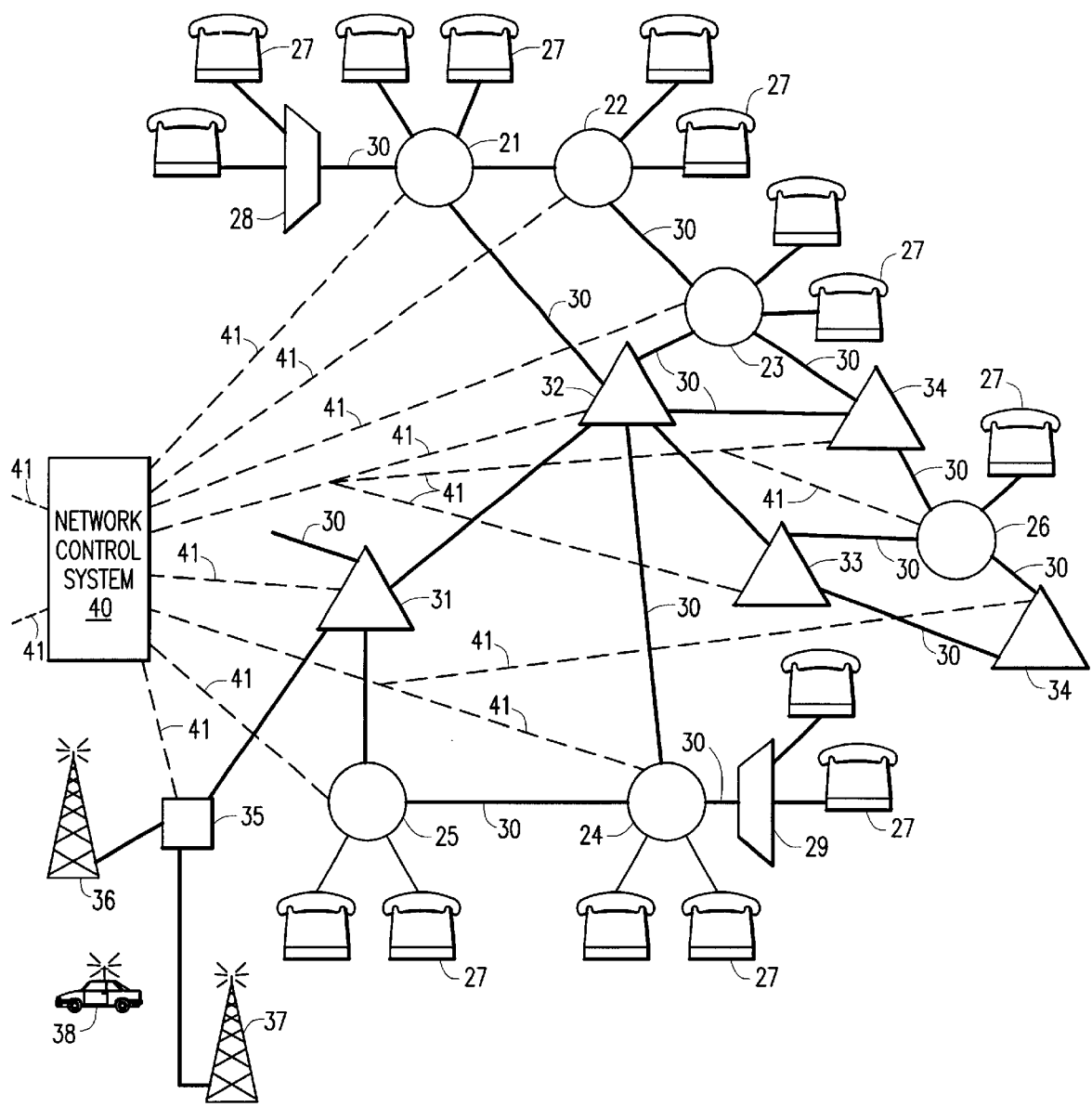
FIG. 1 is a block diagram of an exemplary network consisting of multiple nodes, each of which are under control of the network control system.

Referring to FIG. 1, there is shown an illustrative schematic diagram of a telecommunications network including a plurality of local exchanges 21–26, each of which have a plurality of local subscribers connected thereto and represented by telephone instruments. Two of the local exchanges 21 and 24 are represented as having remote subscriber multiplex stages 28 and 29 associated therewith which, in turn, have local customers 27 connected thereto. The network of FIG. 1 also includes a plurality of trunking exchanges 31–34 which serve primarily to interconnect various local exchanges with one another and to provide routes between various parts of the network. Trunk exchange 31 is shown connected to a mobile exchange 35 which includes a pair of illustrative base stations 36 and 37 servicing a plurality of mobile radio telephone subscribers represented at 38. In addition, other telecommunication services, such as databases and intelligent networks, may also be connected to various ones of the exchanges shown. Between each of the exchanges 21–35 of the network, there is shown a plurality of communications paths 30, each of which may comprise a plurality of communications circuits, including cables, optical links, or radio links for carrying voice and/or data communications between the various exchanges within the network.

The network of FIG. 1 also includes a network control system 40, which is connected to each of the exchanges 21-35 within the network by means of communication links 41 (represented by dotted lines) for the transmission of control signals to each exchange and for the reception of traffic data from each exchange. The network control system 40 includes a subsystem for continuously monitoring the traffic on each of the available routes within the network and issues commands to dynamically reconfigure the communication paths within the various traffic routes of the network, as well as to control the alarm system within the exchanges of the network in order to fine tune the congestion conditions within the network.

Figure 2:
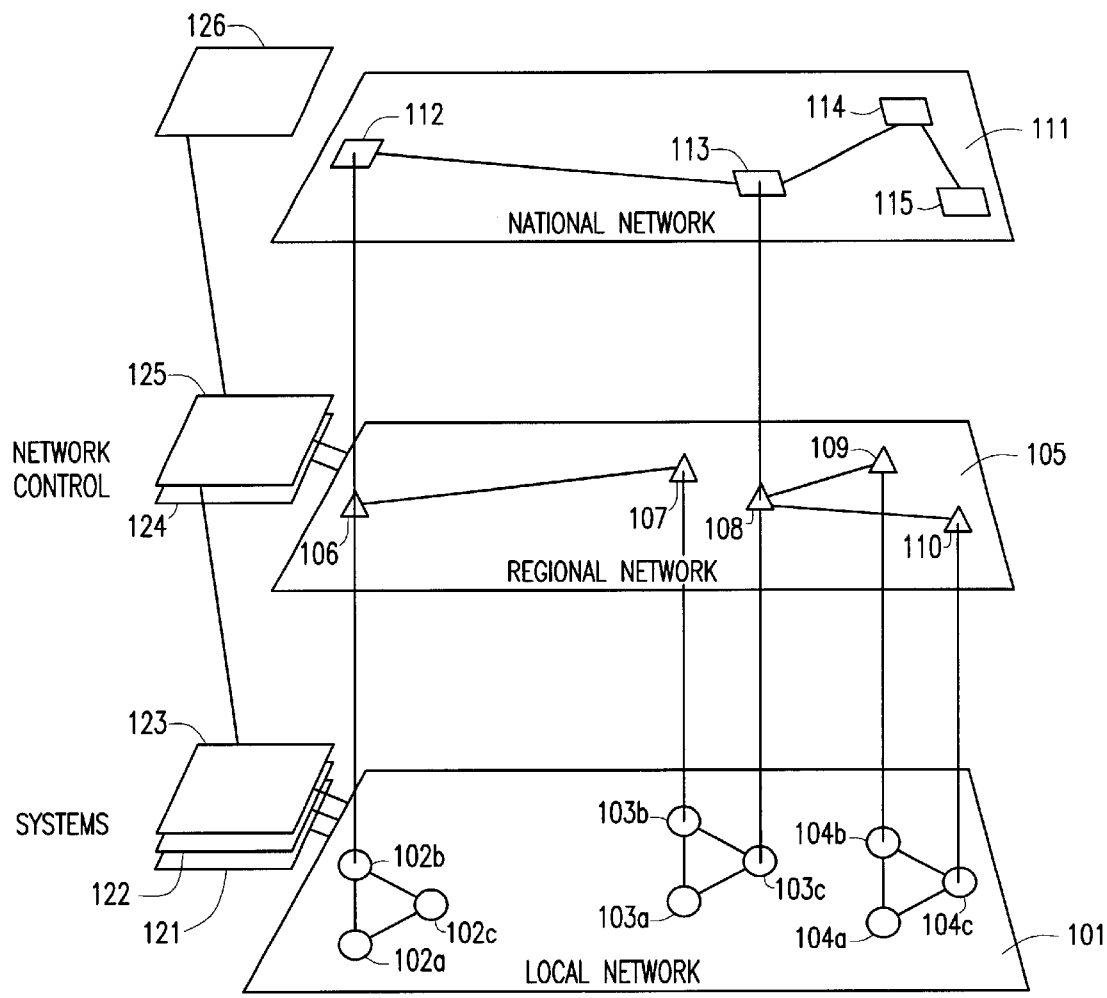
FIG. 2 is an illustrative diagram of hierarchical telecommunication networks.

Referring next to FIG. 2, there is shown an illustrative diagram of a hierarchical implementation of a network traffic control system. A first plane 101 represents the local network comprising a plurality of local exchanges, such as 102a–102c, 103a–103c, and 104a–104c, each group of which could represent local exchanges within a single geographic area code. For example, local exchanges 102a–102c could be within the New York area code of 212; exchanges 103a–103c could be within the Washington D.C. area code of 202; and exchanges 104a–104c could be local exchanges within the Dallas area code of 214. The second plane 105 represents a regional network level and could include traffic transit exchanges 106–110, each of which might be located in a separate geographic region and be connected to the different local exchanges to provide interconnection routes between them. Finally, the third plane 111 represents a national network level and could include international transit exchanges 112–115, which might be located in various geographic locations and connected to couple the various regional transit exchanges 106–110 to international transit exchanges located in different countries of the world.

The network control systems 121–123 might be associated respectively with each of the local network exchanges 102a–102c, 103a–103c, and 104a–104c, respectively, for monitoring the traffic: and controlling the configuration of those local networks. Similarly, the network control systems 124–125 might be associated with regional transit exchanges 106–107 and 108–110, respectively, to monitor traffic and control congestion of the networks on those levels. The network control system 126 is associated with the national network level transit exchanges 112–115 to monitor their traffic and control the network congestion on that level. Network congestion control requires monitoring the traffic and congestion levels at each of the network nodes forming the network. Thus, each node represents a point of data collection with respect to both congestion and available traffic carrying capacity within the routes of the network useful in implementation of the system of the present invention. It can be seen by the example of FIG. 2 that monitoring of available traffic carrying capacity can be implemented in accordance with the system of the present invention at various levels in a network and in various combinations within each of a plurality of different levels on the network.

Figure 3:
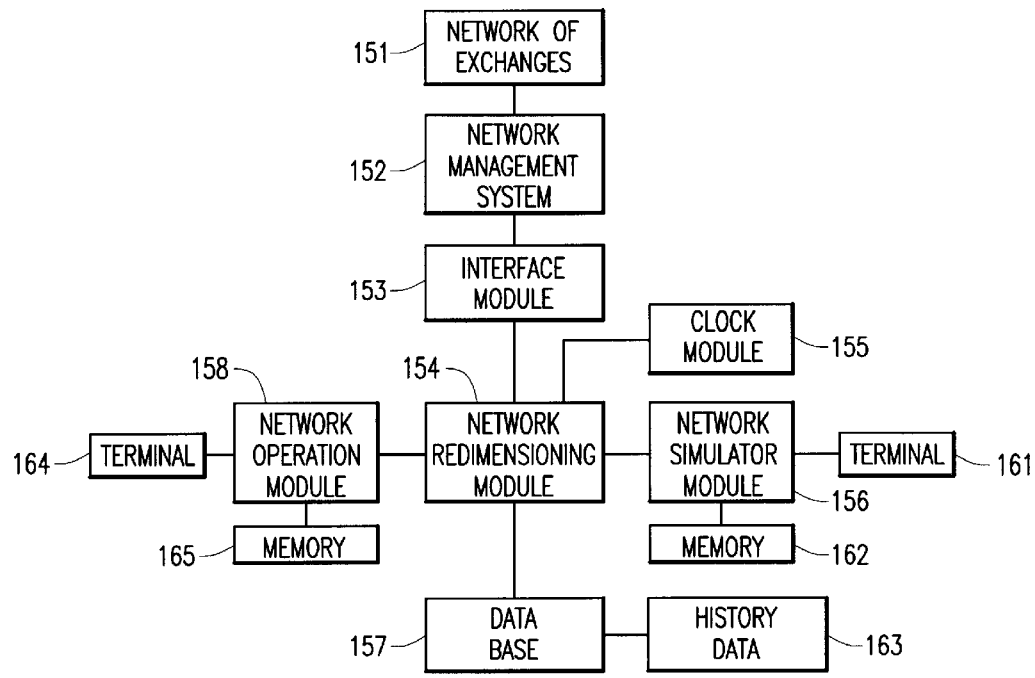
FIG. 3 is a block diagram of an automatic network congestion control system.

Referring next to FIG. 3, there is shown a block diagram of an automated system for reconfiguring exchanges and their interconnections with the network which incorporate systems and operations used in the present invention. A network of exchanges 151 is connected through a network management system 152 via an interface module 153 to a network redimensioning module 154. The network redimensioning module 154 is connected to a clock module 155, a network simulator module for hypothetical study of network reactions 156, a database 157, and a network operation module 158. The network simulator module 156 is coupled to both the terminal 161 for the input and output of data and to a memory 162 for the storage of data used by the network simulator module. The database 157 also includes a history data module 163. The network operation module 158 similarly includes a terminal 164 for the input and output of data and a memory 165 for the storage of data.

The network operation module 158 handles the operation and maintenance menus for the switch reliability review and network reliability review methods of the network maintenance systems. Most modern SPC telephone exchanges, such as the Ericsson AXE-10, an earlier version of which is disclosed in the article of Mats Eklund, et. al., entitled "AXE10—System Description," published in *Ericsson Review,* No. 2, 1976, which is hereby incorporated herein by reference, includes software functions for the measurement, recording, and output of a wide variety of traffic and fault related data. These measurements and output are discussed in more detail in U.S. Pat. No. 5,359,694.

The network redimensioning module 154 is based upon the standard ductwork, route dimensioning optimization programs used in convention SPC exchanges, such as the "LUNA" program used in the AXE exchanges, to decide upon and specify the number and configuration of circuits and routes based upon traffic performance referred to above. These programs are normally loaded with anticipated traffic data such as traffic interest, number of subscribers in traffic load and produce a determination of where it is best to locate proposed new exchanges, the size of such exchanges and the configuration of the routes there between. Records indicating traffic history data, data related to the time of the day and season of the year, are stored within the database 157 to provide information for the network redimensioning module. Overflow of the network is converted to the network management system control function commands for each exchange which enables a soft reconfiguration of the network in the most efficient manner by converting the overflow to commands which limit the originating traffic as close as possible to its origin. Alternatively, if the network is equipped with digital cross-connect (DCC), a new connection may be established between the overloaded sources and destinations.

The network simulation module 156 enables the testing and evaluation of real time measures to bring technical help, including selection of the most suitable real time measures for each exchange. For example, if call gap restrictions are to be used before the restrictions of accessible outgoing circuits, those conditions may be simulated in this module 156, which also permits evaluation of the efficiency of the recommended network management functions. The network simulation module 156 further allows an event network hypothetical or "what if" simulation according to situations described in an off-line scenario for such exchange. It allows a simulation of the switch parameter function results, for example, between the origination and destination. In addition, it allows the saving of results of a simulated scenario in the creation of a file for a simulated scenario, as well as the transfer of the redimensioning program into network redimensioning module 154. The network simulation module 156 works interactively with the network redimensioning module 154 to present the traffic results and consequences of the simulated event. It also allows a simulation of the next event and adds the results to the file in a real time network management situation to simulate the results of the measures proposed for the actual actuation of those commands. The system of FIG. 3 allows the automated implementation of a switch reliability review and network reliability review based upon network route congestion procedures as well as a highly sophisticated system for optimizing network circuit utilization prior to the production of traffic statistics regarding excess capacity use in implementing the system of the present invention.

Figure 4:
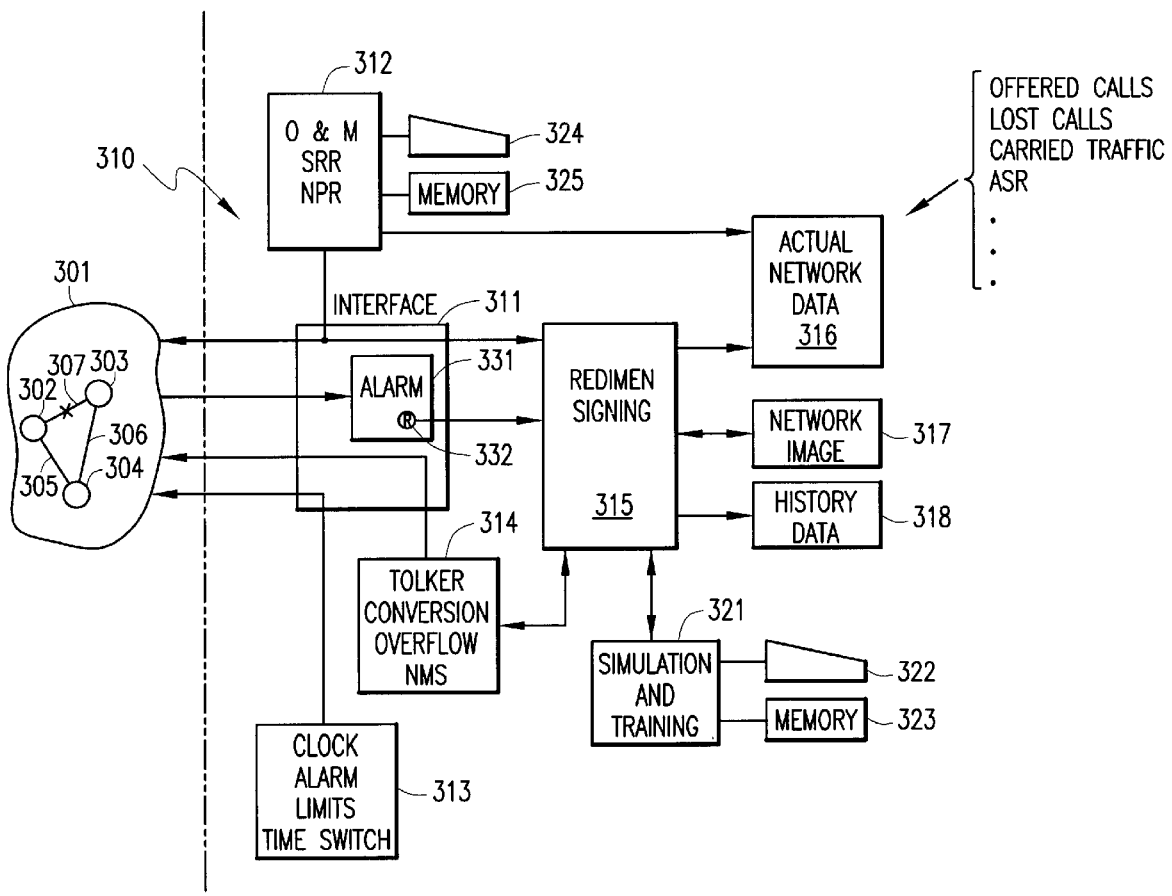
FIG. 4 is a block diagram of an automatic network congestion control system.

Referring next to FIG. 4, there is shown a block diagram of another embodiment of an automated system for reconfiguring the exchanges in their interconnections within the network in order to implement automatic real time reconfiguration thereof and which also includes certain components and elements, the outputs of which may be used in the system of the present invention. Network 301 includes exchanges 302, 303, and 304 which are interconnected with one another by means of routes 305, 306, and 307. The exchanges 302–304 of the network 301 are connected to a network management and control system 310 through an interface module 311. The interface module 311 serves to couple to the network and operation and maintenance module 312, a clock module 313, a command conversion module 314, and a redimensioning module 315. Connected to the redimensioning module 315 are several memory modules, one for actual network data 316, one for network image 317, and one for historical data 318. A simulation and training module 321 is also connected to the redimensioning module 315 and includes an input device 322 and a memory 323.

The interface module 311 operates on interrupt principles by assigning different levels of priority to various events, such as, loss of an exchange (highest priority), route alarms, operator intervention, and other network parameters generated by the network management subsystem; for example, answer seizure ratio, percentage of overflow, all circuits busy, etc. The interface module serves not only to couple signals into and out of the network 301, but also to analyze network alarms and operating conditions and supply information to other parts of the system.

The operation and maintenance module 312, which includes an input terminal 324 and a memory 325, performs periodic operation and maintenance reviews of the functioning of the network including switch reliability reviews (SRR) and network performance reviews (NPR) which makes it possible to compile various statistics based upon the moment-to-moment congestion within the network and the excess traffic carrying capacity in various parts of the network. This module implements the traffic and technical corrective measures to the network to perform congestion analysis and tuning of the network as well as the production of certain data with regard to excess capacity in routes of the network which can be used in the system of the present invention. The clock module 313 monitors the time parameters related to traffic within the network and includes the capability of changing the various classes and levels of the alarm within the networks as a function of the traffic profile history data. The clock module includes a history database of the traffic profile for each exchange in the network as a function of both the season and time of day. It also includes data on all time based preplanned routing changes. This module directly controls the switches in the network to change the alarm limits based upon time differences within the network. For example, for the time period during which the route from Stockholm to Sydney is in the busy hour mode, the system may increase the importance of the alarm on the route because it enhances economic significance of interruption to those circuits during that period. It also allows reassignment of routes and circuits within the network to take advantage of excess circuit capacity in certain routes during their least occupied periods, and includes the capability of handling the reassignment and policing of excess circuit capacity allocated to others in the course of implementing the system of the present invention.

The command conversion module 314 converts the overflow traffic values obtained from the redimensioning module 315 to network management subsystems commands in order to limit the traffic which cannot be carried by the effective exchanges at that particular time. Such overflow traffic, for example, due to loss of an exchange, low answer/seizure ratio or exaggerated increase in traffic interest to a particular destination, will be limited as close as possible to its origin by the command sent from the command conversion module 314.

In determining whether the network has sufficient resources for existing traffic, as well as existing excess capacity for marketing to others who need that capacity, the redimensioning module 315 may make use of existing network optimization programs as discussed above. In order to perform these functions the redimensioning module 315 uses actual network data from memory module 316 within which is stored measured traffic data such as the number of offered calls, the number of lost calls, carried traffic, answer/seizure ratio (ASR), etc. Such data may be in the form of a graphic representation of the actual traffic configuration showing a slope for each of the measured parameters. The redimensioning module 315 also uses information from the network image module 317 which contains data related to the particular configuration, such as the number of exchanges, the number of routes, the size of the routes, the maximum number of subscribers connected to each exchange, the type of signaling in use, destination of routes, etc. The information stored in the history data module 318, and used by the redimensioning module 315, relates to the historically normal traffic for that particular region and for particular times of the year and times of the day.

The simulation and training module 321 makes it possible to test the system and obtain information about how the network could react under various types of operation conditions and alarms. It enables communication with the redimensioning module 315 in an off-line mode to evaluate the decisions taken in previous scenarios and determine whether there are better solutions which may be implemented in the event the same events occur again.

Figures 5, 6:
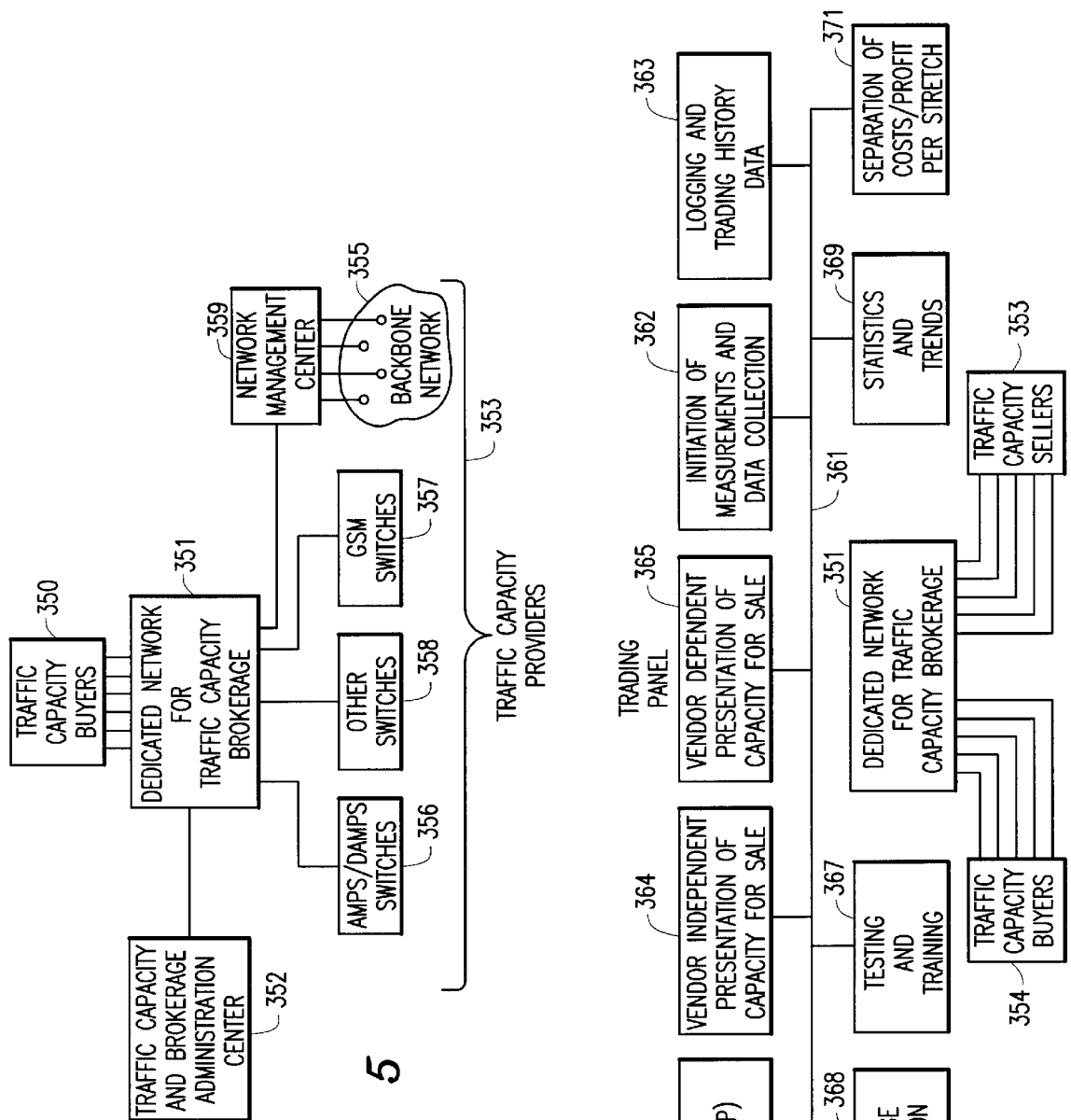
FIG. 5 is a block diagram of a dedicated overlay network for reporting of traffic capacity in accordance with the system of the present invention.
FIG. 6 is a block diagram of an implementation of a traffic capacity and brokerage administration center described in FIG. 5.

Referring next to FIG. 5, there is shown a block diagram of a system constructed in accordance with one aspect of the present invention for providing a unitary, dedicated overlay network for the assessment and reporting of traffic, switching and signaling capacity within a network environment. The system of FIG. 5 essentially comprises a vendor independent network element for compiling and formulating a unitary presentation of excess traffic capacity for sale to others. A dedicated network for traffic carrying capacity 351 is connected to a traffic capacity and brokerage administration center 352. The center 352, which will be described more fully below, essentially monitors and controls the excess traffic capacity within the network and enables the operation of a brokerage operation in which traffic capacity providers 353 are matched with traffic capacity buyers 354. Capacity providers 353 may illustratively include the various elements and nodes controlled by a network management center (NMC), as well as various individual network elements, serving, for example, public switched telephone network (PSTN) switches 356, public land mobile network (PLMN) switches 357 as well as other telecommunications switches 358, such as packet switched public data network (PSPDN) switches, integrated service digital network (ISDN) switches, and circuit switched public data network (CSPDN) switches. Some backbone networks 355 are controlled by NMC's 359 and some are not. In the event they are, the NMC can report the traffic information for each of the switches which it controls. Both networks and switches which are not under the control of a NMC are individually connected to the brokerage administration center as employed in the present invention. The backbone network 355 shown in FIG. 5, is illustratively under control of a network management center 359, which is operating to continuously monitor and tune the congestion within various routes of the backbone network 355 and report the traffic condition within each of the switches comprising the network.

Each of the traffic capacity providers 353 employ various means for monitoring the availability of traffic carrying capacity within their respective switches and networks and reporting such excess capacity to the traffic capacity brokerage network 351 as discussed above. Each provider, in turn, feeds the information to the traffic capacity and brokerage administration center 352, which furnishes that information to various traffic capacity buyers on an operator independent basis and enables those traffic capacity buyers 354 to obtain an agreement to provide them with traffic capacity.

In FIG. 6, there is shown a more detailed embodiment of a traffic capacity and brokerage administration center implemented through an exemplary local area network (LAN), which interconnects the various elements of the system of the present invention. As shown in FIG. 6, the dedicated network for traffic capacity brokerage 351 is connected to both traffic capacity buyers 354 and traffic capacity sellers 353 to make excess capacity available within the capacity providers networks available to those who need it. A central local area network 361 is used to both compile and present data with respect to available traffic carrying capacity which can be illustratively received from database sub-systems (DBS), statistics and traffic measurement sub-systems (STS), or from operation and maintenance sub-system (OMS) measurement print-out parameters, each of which are operational subsystems forming part of the Ericsson AXE-10 SPC telecommunications system. Similar traffic data gathering and analysis systems are provided by other vendors for their switching systems.

The traffic capacity and brokerage administration center of the present invention could also initiate traditional statistics measurements systems, similar to those described in connection with the redimensioning systems discussed above connection with FIGS. 3 and 4 above, which could be used to gather information useful for the marketing of excess traffic capacity. Additionally, the system could include a testing and training module 367 making it possible for parties to verify the correctness of price and availability of traffic capacity in connection with bids, system installation and functionality, brokerage system performance in cases of severe overload of the system and well as various routines and procedures related to trading activity. It also performs testing and training for the operators of both the brokerage system and its participants.

Referring to FIG. 6, it can be seen that also connected to the LAN 361 as part of the present system, is a measurement module 362 which includes the capability of initiating measurements and data collection with respect to traffic capacity. This module works in conjunction with the existing systems for monitoring traffic capacity of a network discussed above. A logging module 363 provides the functionality of logging and storage of trading history data to enable the establishment of pricing and other market parameters for network capacity. A vendor independent presentation module 364 enables the presentation of traffic capacity for resale in a totally independent manner, while a vendor dependent presentation module 365 allows a presentation of traffic capacity for resale in a custom configured manner for any selected vendor. An internet module 366 allows access to the local network via internet protocol (IP) access techniques. The testing module 367 provides testing and training of operators of both the system and participants in the market. An arbitrage module 368 makes it possible for an operator to consider whether or not it is more profitable for it to restrain its own traffic capacity or not. For example, if the price of the available capacity is higher than the operator's own loss from not having the capacity, he may be able to choose to forego the capacity and sell it, thereby increasing his own congestion in favor of a higher profit margin through the marketing of the capacity to others. A statistics and trends module 369 both records present statistics on traffic capacity as well as plots and projects further trends in accordance with standards and techniques. For example, module 369 can monitor and report the number of trade inquires which have been received by the system during a specific period of time (e.g., day/week/month); compile data on specific buyers and sellers during defined periods; track the load placed on the brokerage system itself by various transactions and during various periods; and produce statistics on the demand for capacity over various strains and stretches. Another module 371 includes a separation of cost/profits per stretch and per vendor.

Available operator/traffic capacity, time duration and distance dependent data is gathered by the system of the present invention and reported to a marketing facility (similar to a stock exchange) for virtually real time traffic capacity trading. Global telecommunications operators could have available to them the opportunity for buying traffic capacity on a daily basis. Moreover, international events and changes in business cycles would likely lead to price fluctuation and the definition of a true market place in excess traffic capacity.

The data gathering procedures set forth and discussed in U.S. Pat. No. 5,359,649 can be used to identify free unused traffic capacity as well as its time profile and even to guarantee the availability of that traffic capacity for a prescribed period of time. One way in which traffic capacity trading data could be presented by the system of the invention could include a format such as that shown in FIG. 7. As shown there, element 401 would consist of the bandwidth available in Kbits/s while item 402 would define the endpoints of the particular circuit having capacity available, for example, from New York to Singapore. Item 403 could be an indication as to whether or not the traffic capacity was guaranteed in the event, for example, of a link failure. This would affect the value of the available capacity as to whether or not the offeror of it would be willing to guarantee it against any failure of links by providing alternative routing should that occur. Element 404 is a similar indication of whether or not a guarantee is made as to node failure and thereby affecting the value of the available traffic capacity. Element 405 of the traffic capacity trading data set of FIG. 7 indicates the projected blocking of the available links. Element 406 indicates whether or not the available routes have a provision for overflow traffic which will be permitted to go over another switch or network. Element 407 is the identity of the operator who is the actual seller of the available capacity. Element 408 is the buyer of that particular capacity. In the trading environment for excess traffic capacity, a flag is set at 408 once a contract is entered into between the buyer and seller indicating that this block is no longer available. Elements 409, 410, and 411 provide parts of the total strain. A stretch dependent tag or label is used for separation of cost revenues per each individual operator. 412 indicates for what time period the traffic capacity is sold. 413 indicates the time it typically takes to repair a fault leading to an interruption of service in the event no link or node failure guarantee is included with the block. Stems 414–416 indicate if the available capacity being offered is suitable for telephony, facsimile or other types of data traffic and in appropriate cases could be indicated in the form of parts per million (ppm) the number of permitted lost bids out of one million. This also includes the type of signaling used with the strain.

FIG. 8 illustrates an alternative and somewhat simplified presentation of available traffic capacity marketing data. Once a buyer purchases a certain capacity, it could then still use compression algorithms and other techniques to expand the bandwidth of the purchased capacity by giving up a certain quality of speech within that traffic.

Figure 9:
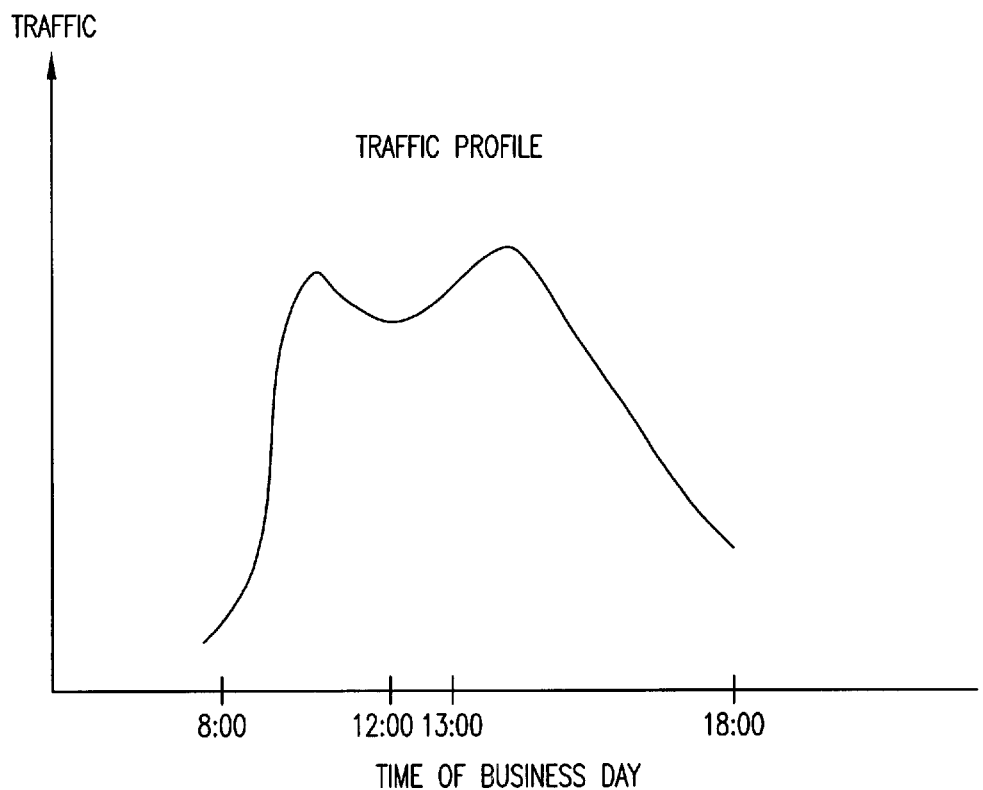
FIG. 9 is a diagram illustrating a daily traffic profile of a network element as a function of time which may be prepared and used in the present invention.

Referring next to FIG. 9, there is shown a graph of a daily traffic profile of a network element as a function of time. The network element may be a route, an exchange or even a transmission link. FIG. 9 illustrates the rise and fall of communications traffic through a network element during a typical business day. As shown in FIG. 9, telephony traffic is very low during the night and early hours of the morning and begins to increase about 8:00 a.m. at beginning of the traditional business day. Thereafter, traffic continues to increase until late morning and then decreases slightly during the noon lunch hour. Thereafter, traffic peaks just after lunch and then steadily decreases until around 6:00 p.m., approximately the end of the typical business day and further decreases to its minimum amounts during the night until the next morning. It can be seen how traffic cycles allow certain portions of a telecommunications network to be virtually unused during certain time periods of the day. Certain amounts of this excess capacity in the network during the non-busy times on that network can be marketed and sold in accordance with the present invention.

Figure 10:
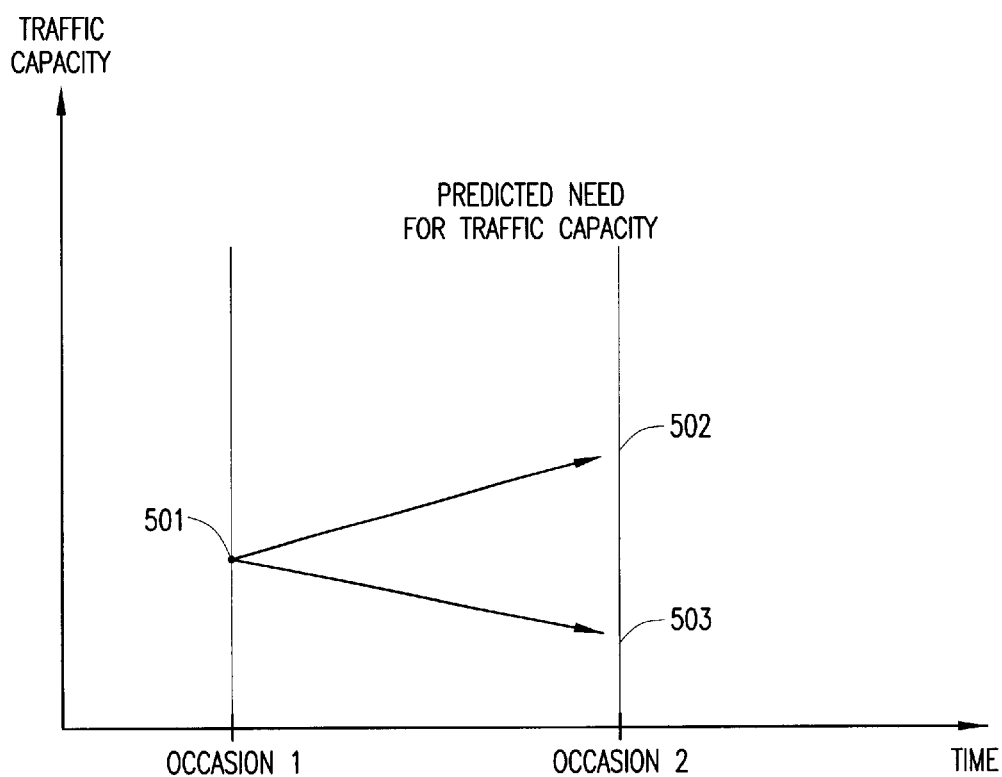
FIG. 10 is a diagram illustrating a traffic prediction chart which may be prepared and used in the present invention.

Referring to FIG. 10, there is shown a graph illustrating one word in which operators attempt to predict the need for traffic capacity within their networks. For example, on occasion 1 the traffic capacity within a network element may assume a certain consistent value 501 and, based upon traffic analysis and reporting systems described above, the operator attempts to predict the traffic capacity which will be acquired in the network element on a second occasion. That capacity may assume a greater value 502 than the initial value 501 or it may decrease to a value 503 less than the initial value 501. In this way, operators attempt to project the need for traffic capacity within their own network elements and accordingly, could (based upon those predictions) market and sell excess traffic capacity or buy needed traffic capacity in accordance with the present invention.

Figure 11:
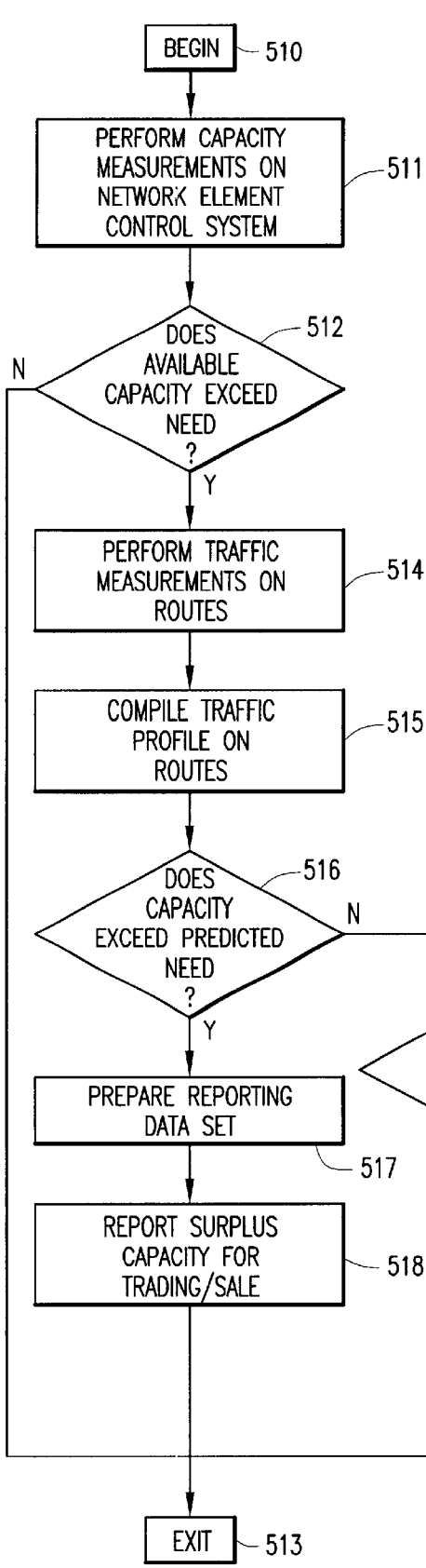
FIG. 11 is a flow chart illustrating a procedure which may be used in the present invention within a network element or network management center.

Referring next to FIG. 11, there is shown a flow chart illustrating the steps of procedures followed in one aspect of the present invention. At 510 the system begins and moves to 511 at which it performs capacity measurements on the network element control system to determine the amount of capacity which is presently available for traffic within the network as well as to project the amount of capacity which will be available within the network during specified time periods in the future. At 512 the system determines whether or not the capacity for telecommunications traffic which is available in the network element exceeds its need for utilization of that capacity. If not, the system concludes that it will need all of the traffic capacity which is available within that network element in order to supply its own needs and, thus, since no excess capacity is available for marketing, it moves to 513 and exits the routine. If, however, at 512, the system concludes that there is excess capacity within the network element, it moves to 514 at which it performs traffic measurements on the different routes of the network element. At 515 the system compiles a traffic profile on the various routes of the network. Such a profile may be similar to that illustrated in FIG. 9. At 516 the system determines whether or not its capacity exceeds the predicted need and if so, moves to 517 at which it prepares a reporting data set in accordance with the procedures described above in conjunction with FIGS. 5–8. At 518 the surplus capacity is reported to interested potential users for their consideration for trading and/or sale of that capacity from the provider having excess to an interested buyer. If, however, at 516, the system determines that available capacity does not exceed the predicted need of the network element, it moves to 519 where it determines whether or not within that network element a decision has been made that the predicted needs of the network element will exceed its capacity. Such a decision could be determined in accordance with the predicted need for traffic capacity analysis illustrated in FIG. 10. If yes, the system exits at 513 and if no, the system moves to 521 and determines whether or not available capacity exists for sale. If there is no capacity to be acquired the system exits at 513 but if capacity does exists and is available, that capacity is purchased at 522.

Figure 12:
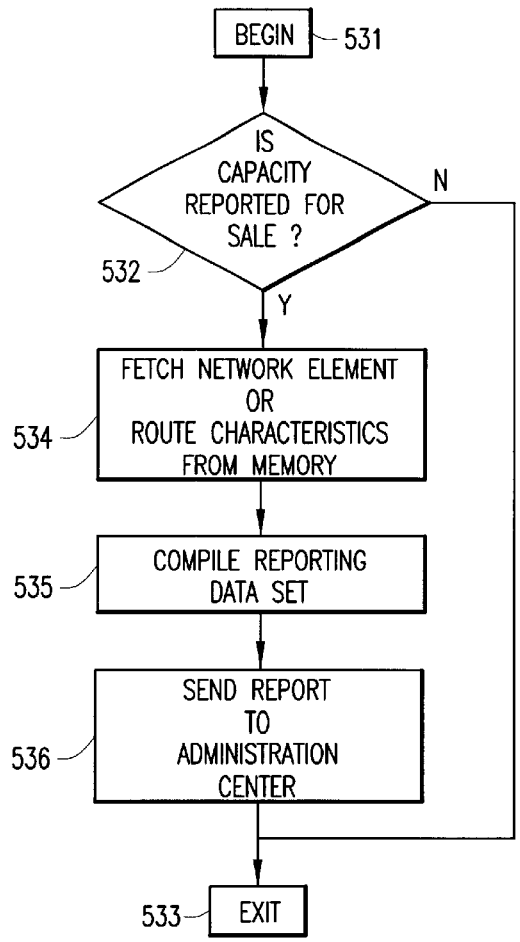
FIG. 12 is a flow chart illustrating a procedure which may be used in the present invention to prepare a capacity reporting data set.

Referring next to FIG. 12, there is shown a flow chart depicting a routine which can be employed for the preparation of a reporting data set as illustrated in step 517 of FIG. 11. In that procedure, the system begins at 531 and determines at 532 whether or not there is capacity which has been reported for sale. If there is no capacity available, the system exits at 533, however, if such is available, it moves to 534 and fetches from memory the network element or route characteristics of the available traffic which has been reported for sale. At 535 the system compiles the reporting data set which may be in a format similar to that depicted in FIGS. 7 and 8 above. At 536, the data set is reported to the administration center of the system for distribution to interested buyers in accordance with the procedures 518 of FIG. 11.

Figure 13:
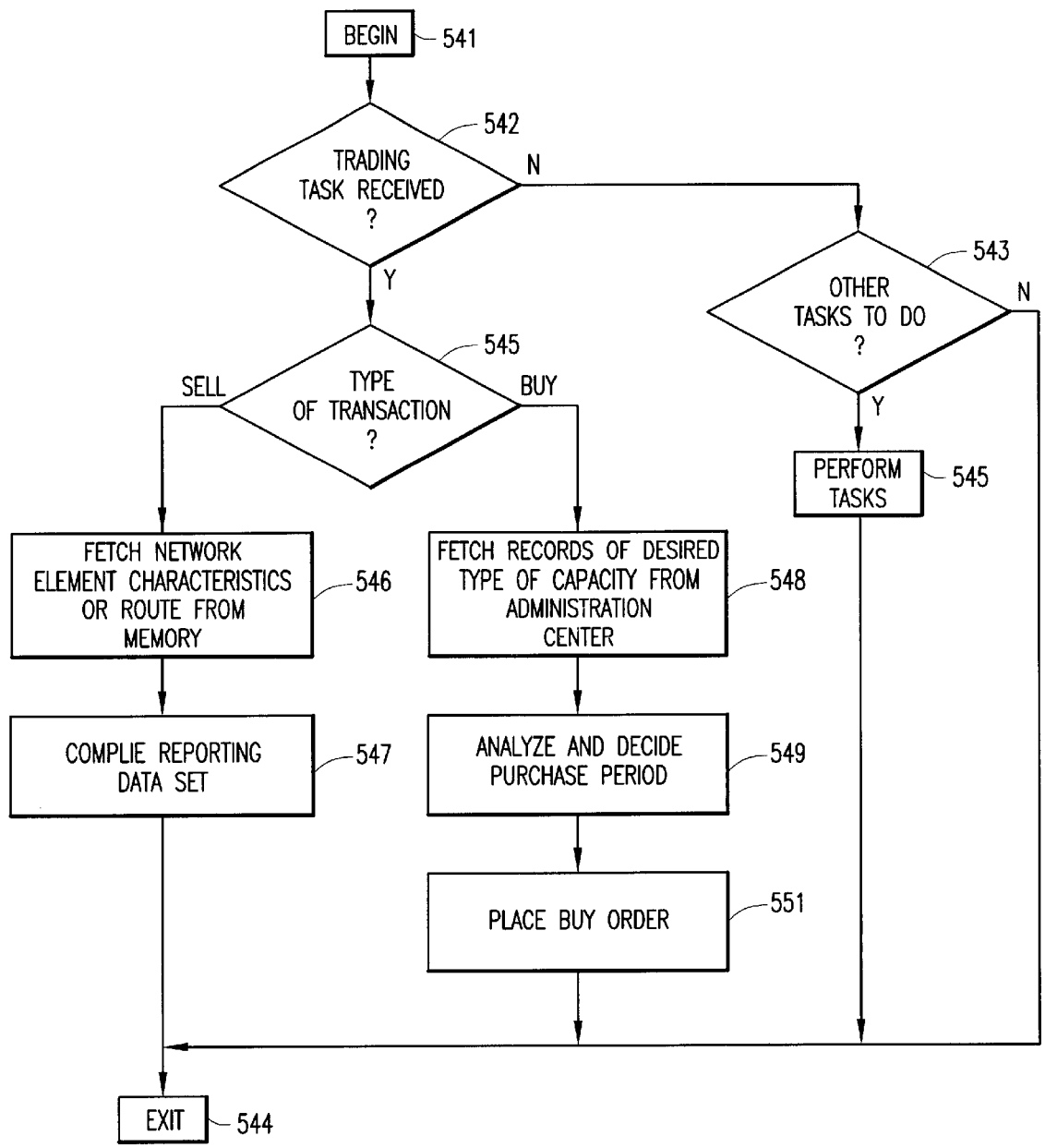
FIG. 13 is a flow chart illustrating a procedure which may be used in the present invention in the handling of a capacity trading data set.

Referring finally to FIG. 13, there is shown a procedure by which the trading data set may be handled by the system of the invention. In this procedure, the system begins at 541, and 542 inquires whether or not a trading task has been received. If not, the system moves to 543 to determine if it has any additional tasks to do and either exits at 544 or performs those tasks at 545 prior to its exit. If at procedure 542, the system determined that the trading tasks had been received, it moves to 545 to determine the type of transaction which has been received. If a "sell" transaction period has been received, the system moves to 546 to fetch from its memory the network element characteristics or routes and then compiles a reporting data set at 547 prior to exit at 544. If, however, a "buy" transaction has been received the system moves to 548 at which it fetches records of the desired type of capacity from the administration center. At 549 the system analyzes. and decides the purchase period covered by the contemplated buy transaction and at 551 places a buy order prior to exiting at 544.

In addition, the system of the present invention might be used for other types of networks, including those in which the power grid is used for transmission of telecommunications traffic. The compilation/evaluation of traffic capacity within the system of the present invention to compile the trading data sets can be performed by real time measurement or from post processing charging data records.

The system of the present invention can also process statistics on the volume of capacity available for sale, the revenues during certain periods of time and vector trends concerning predicted capacity. The system can also include dedicated databases containing compressed history data.

As can be seen from the above, the system of the present invention enables the assimilation of information with respect to available traffic carrying capacity within the network and the distribution of that information to interested buyers and sellers defining a market therefore. This enables the operation of networks at the optimum efficiency for maximum return to both operators and users.

It is thus believed that the operation and construction of the present invention will be apparent from the foregoing description. While the method, apparatus and system shown and described has been characterized as being preferred, it will be obvious that various changes and modifications can be made therein without departing from the spirit and scope of the invention as defined in the following claims.

What is claimed is:

1. A system for optimizing the utilization of network traffic carrying capacity comprising:

a dedicated network element for communicating information related to traffic capacity on various routes within said network;

a dedicated network element for communicating information related to traffic capacity on various routes within said network;

a plurality of network traffic capacity providers connected to said dedicated network element for making available to said network element traffic carrying capacity on idle routes within the respective elements of their network;

a plurality of traffic capacity users connected to said dedicated network element for utilizing available traffic carrying capacity within the network elements of said providers;

a traffic capacity and brokerage administration center connected to said dedicated network element for gathering data with respect to the availability of traffic carrying capacity within the network elements of said providers, formatting those gathered data in a usable form and presenting the formatted data to said plurality of traffic capacity users for possible purchase;

means responsive to purchase of traffic carrying capacity by a purchasing user for interconnecting available traffic routes from providers to said purchasing user; and means for monitoring the continued availability of traffic carrying capacity for a duration of a purchase agreement to ensure that the purchasing user receives the traffic carrying capacity purchased pursuant to said purchase agreement.

2. A system for optimizing the utilization of network traffic carrying capacity as set forth in claim I wherein the traffic capacity and brokerage administration center comprises:

a local area network (LAN) connected to said dedicated network element for collecting and distributing data related to traffic carrying capacity within said network elements;

means for initiating traffic measurements within the traffic carrying elements of said network connected to said LAN; and means connected to said LAN for collecting traffic carrying data received in response to said traffic measurements.

3. A system for optimizing the utilization of network traffic carrying capacity as set forth in claim 2 wherein the traffic measurements initiated are performed by systems located with each traffic capacity providing network element.

4. A system for optimizing the utilization of network traffic carrying capacity as set forth in claim 2 which also includes:

means for configuring received traffic carrying capacity data in a vendor independent format and making said data available to traffic capacity users on said LAN for consideration for possible purchase.

5. A system for optimizing the utilization of network traffic carrying capacity as set forth in claim 2 which also includes:

means for accumulating and storing traffic carrying capacity data within said system to provide potential purchasing users connected to said LAN with historical traffic capacity information to assist them with a purchasing decision related to currently available capacity.

6. A method for optimizing the utilization of available traffic carrying routes within a network comprising:

gathering information related to available traffic carrying capacity on various routes within the network elements of traffic capacity providers within said network;

organizing and formatting the gathered information related to available traffic carrying capacity;

furnishing said organized and formatted information to a plurality of traffic capacity users;

brokering the purchase of available traffic carrying capacity by one or more of said users;

arranging the delivery of access to the purchased traffic carrying capacity of said providers by said purchasing user(s); and monitoring the continued availability of traffic carrying capacity purchased by a user for a duration of a purchase agreement and ensuring that the capacity purchased pursuant to said purchase agreement is received thereby.

7. A method for optimizing the utilization of available traffic carrying routes within a network as set forth in claim 6 wherein said steps are performed utilizing a local area network (LAN) to which are connected both traffic capacity providers and traffic capacity users.

8. A method for optimizing the utilization of available traffic carrying routes within a network as set forth in claim 6 wherein the format within which said traffic capacity data is presented to potential purchasing users includes the following information:

the bandwidth of the available capacity;

the time period within which that bandwidth is available;

the endpoints of the route over which the capacity is available for the specified period; and the traffic capacity provider offering the capacity for purchase.

9. A method for optimizing the utilization of available traffic carrying routes within a network as set forth in claim 8 wherein the format within which said traffic capacity data is presented to potential purchasing users includes the following additional information:

an indication of whether or not the available bandwidth of the traffic carrying routes offered for purchase is guaranteed against link failure by the provision of alternative routing.

10. A method for optimizing the utilization of available traffic carrying routes within a network as set forth in claim 8 wherein the format within which said traffic capacity data is presented to potential purchasing users includes the following additional information:

an indication of whether or not the available bandwidth of the traffic carrying routes offered for purchase is guaranteed against node failure by the provision of alternative routing.

11. A method for optimizing the utilization of available traffic carrying routes within a network as set forth in claim 8 wherein the format within which said traffic capacity data is presented to potential purchasing users includes the following additional information:

an indication of whether or not the available bandwidth of the traffic carrying routes offered for purchase is guaranteed against overflow traffic by the provision of alternative routing.

12. A method for optimizing the utilization of available traffic carrying routes within a network as set forth in claim 6 wherein said traffic carrying routes comprise part of a dedicated telecommunications network.

13. A method for optimizing the utilization of available traffic carrying routes within a network as set forth in claim 6 wherein at least some of said traffic carrying routes comprise a telecommunications network superimposed upon an electrical power distribution grid.

14. A system for optimizing the utilization of available traffic carrying routes within a network comprising:

means for gathering information related to available traffic carrying capacity on various routes within the network elements of traffic capacity providers within said network;

means for organizing and formatting the gathered information related to available traffic carrying capacity;

means for furnishing said organized and formatted information to a plurality of traffic capacity users;

means for brokering the purchase of available traffic carrying capacity by one or more of said users;

means for arranging the delivery of access to the purchased traffic carrying capacity of said provider(s) by said purchasing user(s); and means for monitoring the continued availability of traffic carrying capacity purchased by a user for a duration of a purchase agreement and ensuring that the capacity purchased pursuant to said purchase agreement is received thereby.

15. A system for optimizing the utilization of available traffic carrying routes within a network as set forth in claim 14 wherein said means include a local area network (LAN) to which are connected both traffic capacity providers and traffic capacity users.

16. A system for optimizing the utilization of available traffic carrying routes within a network as set forth in claim 14 wherein the format within which said traffic capacity data is presented to potential purchasing users includes the following information:

the bandwidth of the available capacity;

the time period within which that bandwidth is available;

the endpoints of the route over which the capacity is available for the specified period; and the traffic capacity provider offering the capacity for purchase.

17. A system for optimizing the utilization of available traffic carrying routes within a network as set forth in claim 16 wherein the format within which said traffic capacity data is presented to potential purchasing users includes the following additional information:

an indication of whether or not the available bandwidth of the traffic carrying routes offered for purchase is guaranteed against link failure by the provision of alternative routing.

18. A system for optimizing the utilization of available traffic carrying routes within a network as set forth in claim 16 wherein the format within which said traffic capacity data is presented to potential purchasing users includes the following additional information:

an indication of whether or not the available bandwidth of the traffic carrying routes offered for purchase is guaranteed against node failure by the provision of alternative routing.

19. A system for optimizing the utilization of available traffic carrying routes within a network as set forth in claim 16 wherein the format within which said traffic capacity data is presented to potential purchasing users includes the following additional information:

an indication of whether or not the available bandwidth of the traffic carrying routes offered for purchase is guaranteed against overflow traffic by the provision of alternative routing.

* * * * *